United States Patent [19]
Kuhlmann et al.

[11] Patent Number: 6,053,033
[45] Date of Patent: Apr. 25, 2000

[54] DEVICE FOR DETERMINING THE POSITION OF THE CENTER OF GRAVITY OF A TEST BODY

[75] Inventors: Otto Kuhlmann; Detlev Erben, both of Göttingen; Rudolf Müller, Bovenden, all of Germany

[73] Assignee: Sartorius AG, Göttingen, Germany

[21] Appl. No.: 09/161,297

[22] Filed: Sep. 28, 1998

[30] Foreign Application Priority Data

Oct. 4, 1997 [DE] Germany .................... 197 43 832

[51] Int. Cl.[7] .................................................. G01M 1/12
[52] U.S. Cl. ................................................... 73/65.01
[58] Field of Search .......................... 73/65.01, 65.09, 73/862.042, 483, 486

[56] References Cited

U.S. PATENT DOCUMENTS 4,428,225  1/1984  Kato et al. ............................ 73/65.09

Primary Examiner—John E. Chapman
Attorney, Agent, or Firm—Eric P. Schellin

[57] ABSTRACT

An apparatus for determining the position of the center of gravity of a test body with a test-body receiving plate supported on at least two weighing systems with short displacement in which device the position of the center of gravity is calculated from the particular bearing forces on the weighing systems that the connection between the test-body receiving plate (2) and the weighing systems (12, 13) takes place by means of coupling elements (22, 23) which are permanently connected by their one end to the test-body receiving plate (2), which are connected permanently by their other end to a weighing system (12, 13) and which are designed to be elastically flexible by means of at least one thin area (33, 34) defining a horizontal axis of rotation. This avoids an undefined introduction of force possibly overlaid by frictional forces and frictional moments into the weighing systems and thus increases the measuring accuracy.

4 Claims, 4 Drawing Sheets

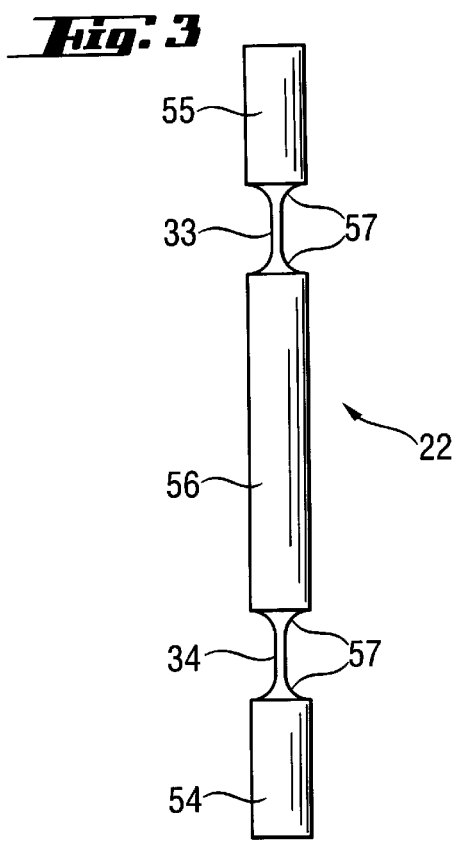
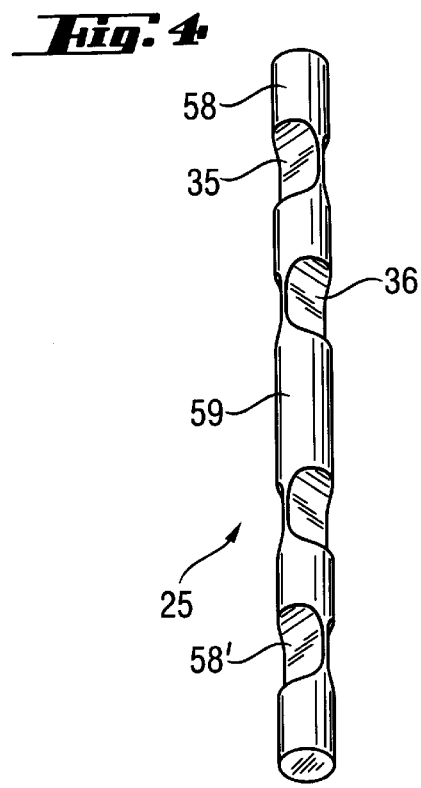
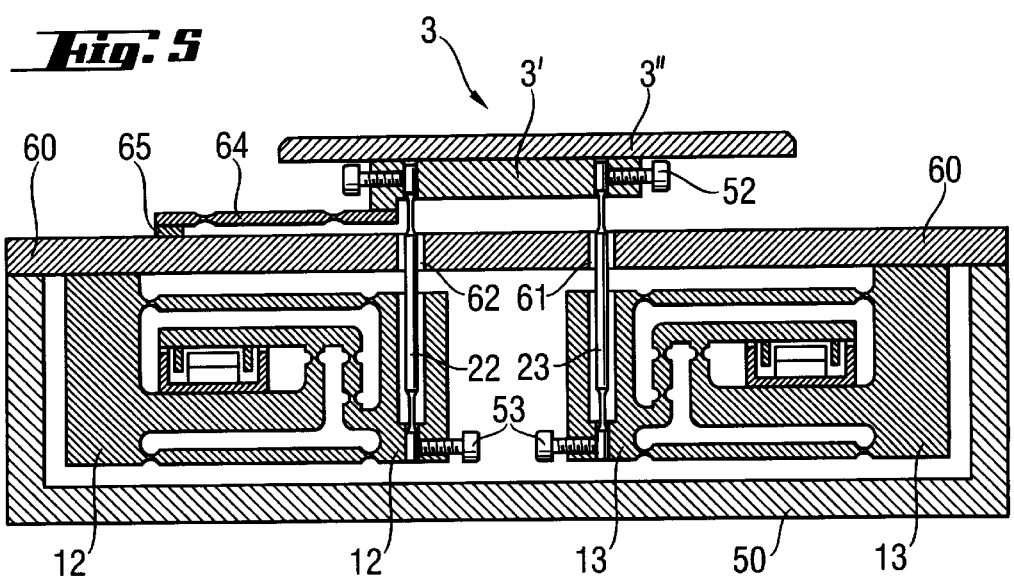

DEVICE FOR DETERMINING THE POSITION OF THE CENTER OF GRAVITY OF A TEST BODY

BACKGROUND OF THE INVENTION

The invention is relative to a device for determining the position of the center of gravity of a test body with a test-body receiving plate supported on at least two weighing systems with short displacement. The position of the center of gravity is calculated from the particular bearing forces on the weighing systems.

Devices of this type are known e.g. from DE patent 34 40 571; U.S. Pat. No. 3,221,543; DE-OS 23 63 157; DE-OS 34 19 546 or U.S. Pat. No. 5,187,976. In them the position of the center of gravity can only be determined in one direction when using two weighing systems with two support points, which is frequently sufficient e.g. in the case of rod-shaped objects whereas in order to determine the center of gravity in two coordinate directions three weighing systems with three support points are necessary. The determination of the center of gravity in two coordinate directions is necessary and sufficient e.g. to compensate for disk-shaped test bodies such as e.g. wheels or grinding disks.

Known devices of this type have the disadvantage of the undefined transfer of force between the test-body receiving plate and the weighing systems. In DE patent 34 40 571 the test-body receiving plate has two conical tips and a roller on the bottom which rest loosely on the level surfaces of the weighing systems. In DE-OS 34 19 546 the test-body receiving plate has spherical areas on the bottom with which it rests loosely on the level surface of the weighing systems. In U.S. Pat. No. 5,187,976 the test-body receiving plate is supported by edges on the weighing systems. DE-OS 23 63 157 speaks only of a resting on the balances without more specific indications, just as in U.S. Pat. No. 3,221,543. This undefined bearing can, for example, become contaminated and transfer undefined moments of torque by friction, which results in measuring errors. The same applies to the instance in which the bearing countersurface is not quite level, e.g. due to phenomena of wear. Moreover, temperature differences between the test-body receiving plate and the base frame can result in undefined lateral forces on the weighing systems which negatively influence their measuring accuracy.

The invention therefore has the problem of indicating a device of the initially mentioned type which excludes these errors and thus results in a greater measuring accuracy.

SUMMARY OF THE INVENTION

The invention achieves this in that the connection between the test-body receiving plate and the weighing systems takes place by means of coupling elements which are permanently connected by their one end to the test-body receiving plate, which are connected permanently by their other end to a weighing system and which are designed to be elastically flexible by means of at least one thin area defining a horizontal axis of rotation.

This creates a practically frictionless and therefore reproducible connection between the test-body receiving plate and the weighing systems which, moreover, transfers only minimal lateral forces.

Advantageous embodiments result from the subclaims.

The invention is described in the following with reference made to the schematic figures.

BRIEF DESCRIPTION OF THE DRAWINGS

FIG. 3 shows a coupling element with two vertically superposed thin areas in a first embodiment.

FIG. 4 shows a coupling element with two vertically superposed thin areas in a second embodiment.

FIG. 5 shows a second embodiment of the device in vertical cross-section.

DETAILED DESCRIPTION OF THE INVENTION

Figure 1:
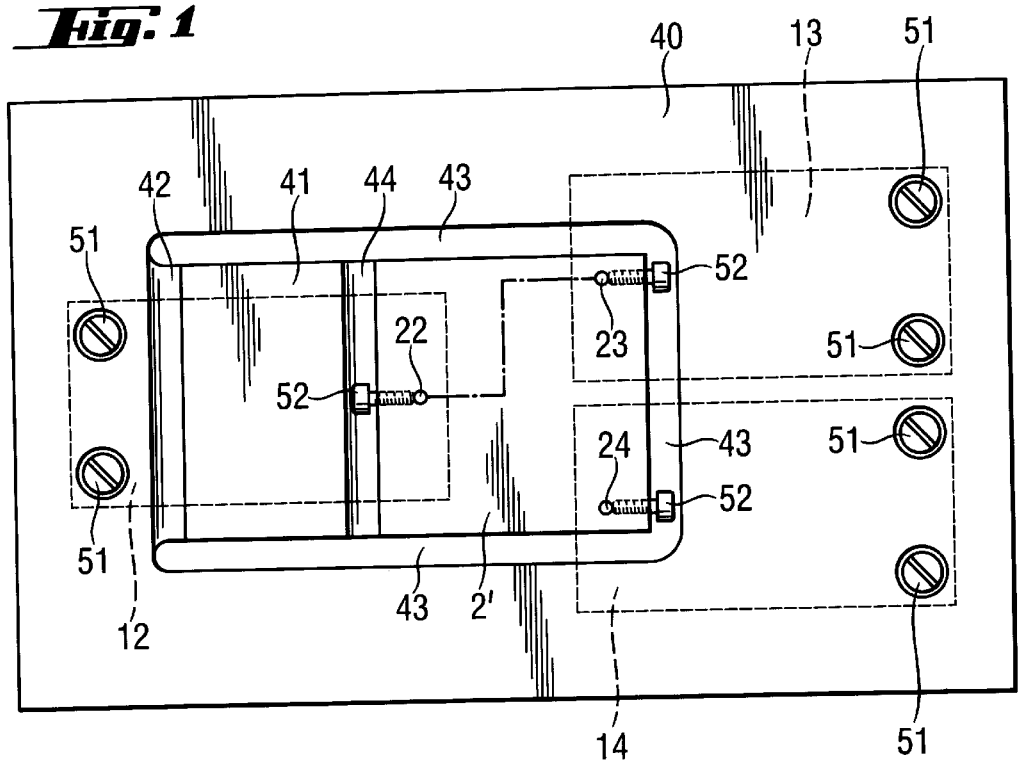
FIG. 1 shows a top view onto the device in a first embodiment.
Figure 2:
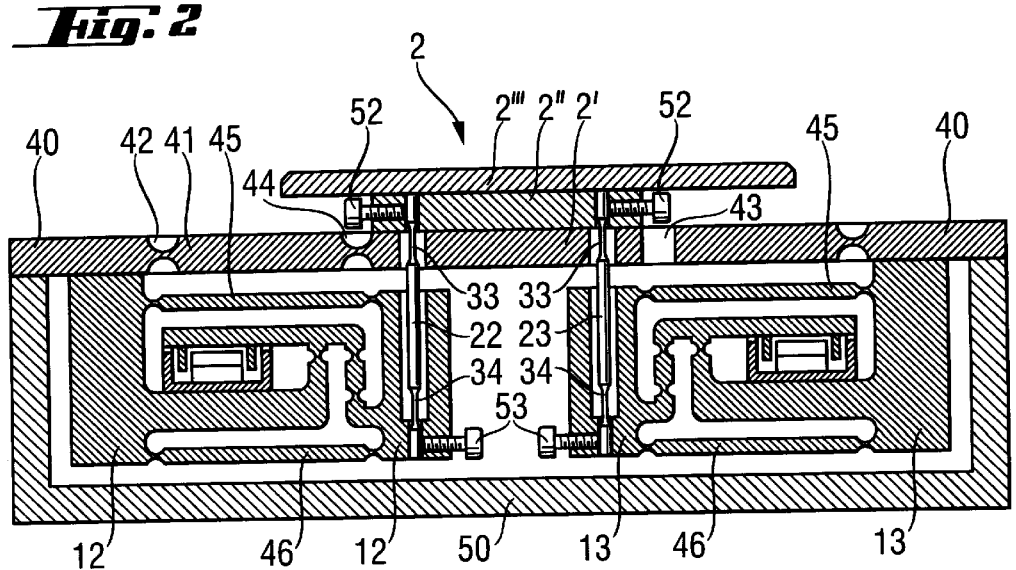
FIG. 2 shows a vertical cross-section through the device along the dashed line 1—1 in FIG. 1.

FIGS. 1 and 2 show a first embodiment of the device. FIG. 1 is a top view and FIG. 2 is a vertical section along the dashed line in FIG. 1. Mounting plate 40 can be recognized, which is held by base part 50 of the housing, recognizable only in FIG. 2. Three weighing systems 12, 13 and 14 are fastened to mounting plate 40 underneath it (screws 51). Test-body receiving plate 2 consists of three parts: Base part 2', middle part 2" and upper part 2'". Base part 2' is a one-piece component of mounting plate 40 and is separated by U-shaped milled-out area 43 from the rest of the mounting plate. Moreover, two parallel thin areas 42, 44 are produced in mounting plate 40 by milled-in areas which delimit guide plate 41 so that base part 2' of the test-body receiving plate is connected to the rest of mounting plate 40 in such a manner that it can move in a vertical direction but is restricted in the two horizontal directions. In addition, this guidance permits a tilting of test-body receiving plate 2 in both directions. The end areas of three coupling elements 22, 23 and 24 are firmly clamped in middle part 2" of the test-body receiving plate with three screws 52. The other end of the coupling elements is connected by screws 53 to the area of the introduction of force of weighing systems 12, 13 and 14. The coupling elements each have a thin area 33 in the upper area and a thin area 34 in the lower area. As a result of thin areas 33, 34 the coupling elements can move laterally somewhat in both directions so that slight lateral shifts of the individual parts relative to each other are compensated. However, the lateral shifts are from the start extremely small in the sketched design: Due to the close thermal coupling of mounting plate 40, test-body receiving plate 2 and weighing systems 12, 13 and 14 hardly any temperature differences arise between these parts so that given the same material of mounting plate and weighing systems even temperature-conditioned lateral shifts are minimal. Due to the parallel guidance from guide rods 45, 46 indicated in FIG. 2 and the electromagnetic compensation of force even the movements within the weighing systems under load are very slight so that for this reason too the thin areas 33, 34 are deflected only minimally. Upper part 2'" of the test-body receiving plate is designed in accordance with the specifications of the customer and carries the receiving devices (not shown) for the test bodies; this can be e.g. receiving pins or lowered areas or contact surfaces. The three parts 2', 2" and 2'" of test-body receiving plate 2 are connected to each other by connection means (not shown) such as e.g. screws. In FIG. 1 upper part 2" of the test-body receiving plate has been left out for the sake of clarity. The calculation of the position of the center of gravity takes place in general by a connected PC which calculates the position of the center of gravity of the test body in a known manner from the output signals of the three weighing systems and from the known position of the points of introduction of force of the weighing systems relative to the receiving device for the test body.

The entire device shown in FIGS. 1 and 2 contains no undefined connections with the defect of external friction and contains no static redundancy, so that the reproducibility is very good. In addition, the device is designed to be very compact so that temperature differences between the individual parts can hardly develop.

The device of FIGS. 1, 2 can also be designed in a corresponding manner with only two weighing systems. Weighing system 14 in FIG. 1 is then eliminated and the two remaining weighing systems 12, 13 are arranged aligned in a line. The vertical section in FIG. 2 remains unchanged. This design can then only determine the position of the center of gravity in one direction (direction left/right in FIGS. 1, 2). However, it tolerates slight shifts of the center of gravity out of the plane of symmetry given by the sectional plane of FIG. 2 since the torque then arising can be caught by a design of guide rod 41 which is more tilt-resistant or wider. Alternatively, the tilt resistance can also be achieved by the use of three coupling elements of which two are supported offset and adjacent to one another on the same weighing system 13 or by a coupling element with a single wide thin area as is described further below for FIGS. 6, 7 and 8.

The device of FIGS. 1 and 2 can also do without guide rod 41 when three weighing systems are used since test-body receiving plate 2 is held in a statically determined manner by the three coupling elements 22, 23 24. In this instance milled-out area 43 would extend rectangularly entirely around lower part 2', therewith separating lower part 2' on all sides from surrounding mounting plate 40. The margin of safety against overload with respect to horizontal forces would then be assured e.g. by an appropriately small width of slot 43. Due to the slight return force of coupling elements 22, 23 and 24 test-body receiving plate 2 would always move back into the correct theoretical position without external horizontal forces. Thus, the device is not as robust without guide rod 41 as it is with guide rod 41; however, for some purposes this is sufficient.

FIG. 3 shows coupling element 22 of FIGS. 1 and 2 again on an enlarged scale. It consists of a round rod which exhibits its original diameter in middle part 56 as well as at its two end areas 54, 55. The cross section of the two thin areas 33, 34 is also circular and the same applies to transitional areas 57. As a result of this rotationally symmetric form the bending resistance of the coupling element is the same in all directions. Coupling elements 23, 24 are designed in the same manner.

FIG. 4 shows an alternative design of the coupling element in a perspective view. It shows upper end area 58, thin-area sections 35/36, middle part 59 and lower end area 58'. In this embodiment coupling element 25 has two closely adjacent thin areas 35, 36 with the horizontal axes of rotation defined by the thin areas lying vertically in relation to one another. A possibility of bending coupling element 25 in all directions can also be assured by this embodiment. The slight vertical shift of the two axes of rotation is insignificant for operation.

FIG. 5 shows a second embodiment of the device of the invention in vertical section. This second embodiment differs from the first embodiment in FIGS. 1, 2 in that mounting plate 60 is designed to be continuous and contains only three perforations of which perforations 61, 62 can be recognized in FIG. 5. Weighing systems 12, 13 and the third weighing system (not recognizable) are also identical, as in the first embodiment. Test-body receiving plate 2 consists only of a lower part 3' located closely above mounting plate 60 and of an upper part 3" which again carries the customer-specific receiving devices for the test bodies to be measured. Coupling elements 22, 23 and 24 are again fastened by screws 52 to bottom part 3'. In addition, horizontal guide rod 64 is fastened to lower part 3' of the test-body receiving plate which guide rod is connected on its other end to mounting plate 60 with interpositioning of support plate 65. In this modular design mounting plate 60 is constructed in a much simpler manner since it has only the three through perforations for the coupling elements and a few fastening bores. Guide rod 64 can, depending on the requirements of the individual instance, be omitted or mounted in such a manner that this design has the advantage of being readily adaptable. If needed, a second guide rod can optionally be built in on the opposite side or rotated through 90° relative to guide rod 64. The thermal coupling between test-body receiving plate 3 and mounting plate 60 remains good since lower part 3' of the test-body receiving plate is located with a large surface area at only a slight interval above mounting plate 60.

Figure 6:
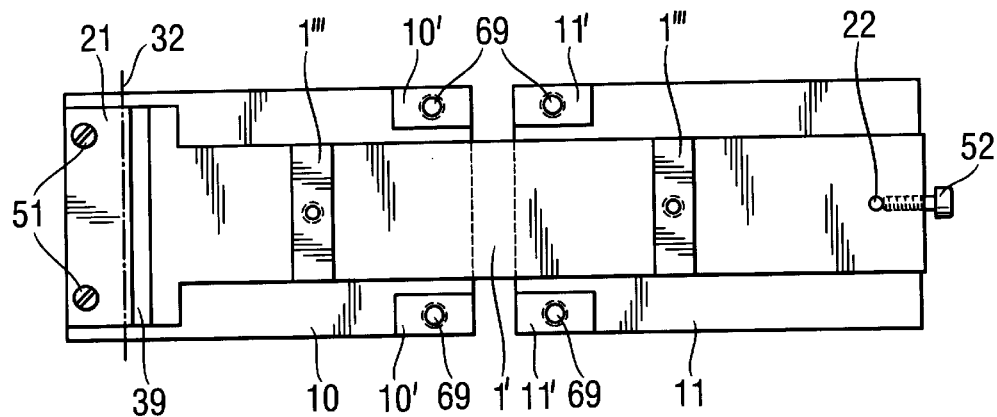
FIG. 6 shows a third embodiment of the device in a top view.
Figure 7:
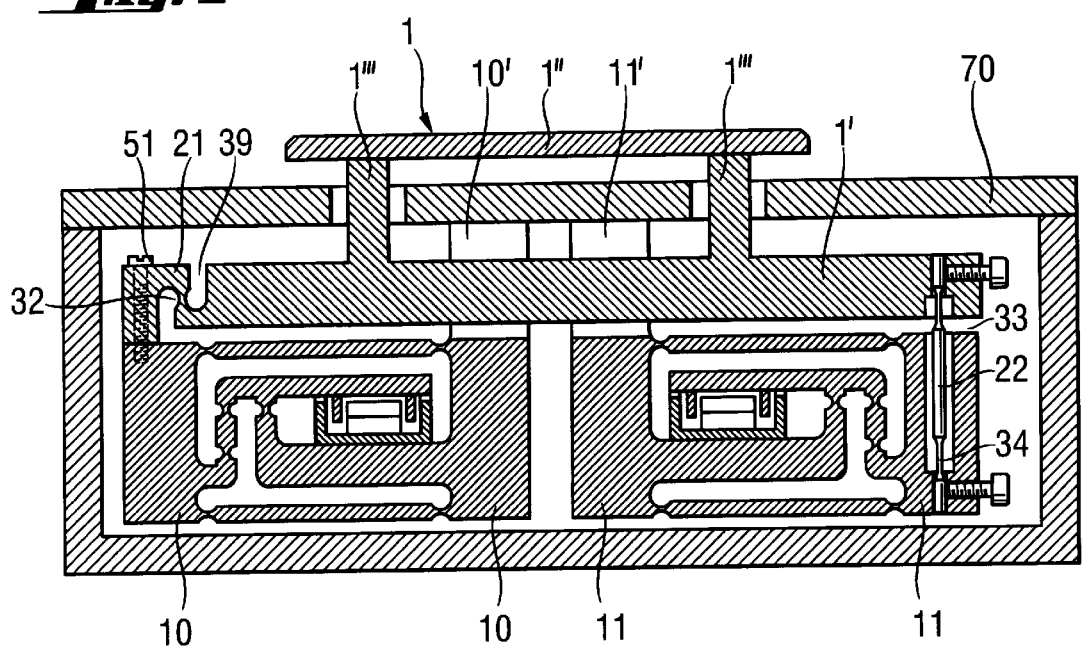
FIG. 7 shows the embodiment of FIG. 6 in vertical cross-section.

FIGS. 6, 7 show a third embodiment of the device of the invention with two weighing systems 10, 11 (therefore, for measuring the position of the center of gravity in only one direction). FIG. 6 is a top view and FIG. 7 a vertical section. Test-body receiving plate 1 consists again of a customer-specific upper part 1" (sketched only in FIG. 7) and of a lower part 1'. Upper part 1" and lower part 1' are connected to one another by supports 1'''. Lower part 1' is supported via a first coupling element 21 with a single wide thin area 32 and notch 39 on the first weighing system 10 and via a second, rod-shaped coupling element 22 with two thin areas 33, 34 on the second weighing system 11. Coupling element 21 and its thin area 32 are indicated in FIG. 6 only by the dotted line. The fact that coupling element 31 has only one thin area results in a greater stability of the test-body receiving plate to lateral forces without producing a static redundancy. Coupling element 21 and thin area 32 are designed to be so wide that even torques can be transmitted which are produced upon lateral deviations of the center of gravity out of the plane of symmetry. Coupling element 22 is designed as is shown in FIGS. 3 and 4. Weighing systems 10, 11 have projections 10' and 11' on which they are fastened to mounting plate 70 by screws. (Threaded holes 59 in projections 10', 11' can be recognized in FIG. 6). A guide-rod guidance for test-body receiving plate 1 is not sketched in this embodiment but can be supplemented if required.

Figure 8:
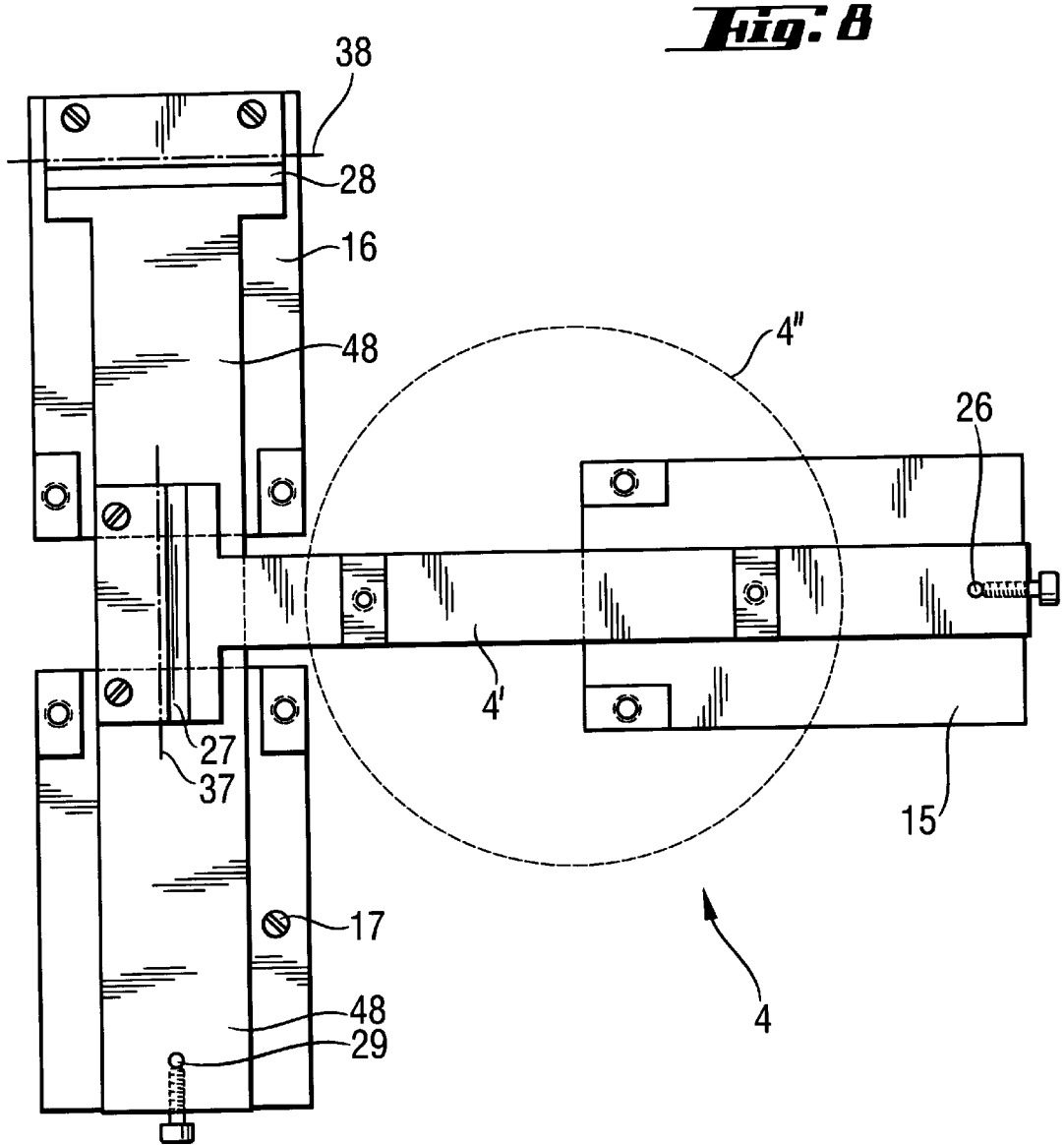
FIG. 8 shows a fourth embodiment of the device in a top view.

A fourth embodiment of the device in accordance with the invention is shown in FIG. 8 in a top view. It is based on the embodiment according to FIGS. 6,7; only a third weighing system was supplemented in order to make it possible to measure the center of gravity in both directions of coordinates. Lower part 4' of test-body receiving plate 4 is supported via a first coupling element 27 to a single wide thin area 37 (indicated in FIG. 8 only by the corresponding dotted line) on force distribution plate 48 and via a second, rod-shaped coupling element 26 with two thin areas on the first weighing system 15. Coupling element 27 is again designed according to FIGS. 3 or 4. Coupling element 27 with its thin area 37 is designed to be so wide that even torques are transmitted onto force distribution plate 48. Force distribution plate 48 is supported via a first coupling element 28 with a single wide thin area 38 (indicated in FIG. 8 again only by the corresponding dotted line) on the second weighing system 16 and via rod-shaped coupling element 29 with two thin areas on the third weighing system 17. Coupling element 29 is designed just like coupling element 26. All three weighing systems 15, 16 and 17 are again fastened to a mounting plate (not shown). Customer-specific upper part 4" of the test-body receiving plate is indicated only by dotted circle 4".

What is claimed is:

1. A device for determining the position of the center of gravity of a test-body comprising a test-body horizontal receiving plate disposed on at least two weighing systems, a horizontal support plate interposed between said test-body horizontal receiving plate and said weighing systems, at least two horizontally displaced downwardly depending support means affixed to the underside of said horizontal support plate, a said weighing system attached to each of said downwardly depending support means in a horizontally thrusting cantilevered position, at least two vertical coupling rods, each of said vertical coupling rods having an upper end portion internally attached to a first cavity receiving means at the underside of said test-body horizontal receiving plate, each of said vertical coupling rods having a lower end portion internally attached to a second cavity receiving means of the cantilevered portion of a weighing system, said horizontal support plate having at least two bores therethrough through which said vertical coupling rods extend respectively, each of said vertical coupling rods having relatively thinner portions at each upper end portion and at each lower end portion.

2. The device of claim 1 wherein the weighing system are three in number.

3. The device of claim 2 wherein the horizontal support plate is affixed to said test-body horizontal receiving plate and said horizontal support plate has thinned out portions to thereby provide for flexibility to said horizontal support plate.

4. The device of claims 1, 2 or 3 wherein the vertical coupling rods internally of said cavity means is held therein by a set screw.

* * * * *